US005656358A

United States Patent [19]

Lafond

[11] Patent Number: 5,656,358

[45] **Date of Patent: *Aug. 12, 1997**

[54] SEALANT STRIP INCORPORATING AN IMPREGNATED DESICCANT

[76] Inventor: Luc Lafond, 23 Woodvalley Dr., Etobicoke, Ontario, Canada, M9A 4H4

[ * ] Notice: The term of this patent shall not extend beyond the expiration date of Pat. No. 5,436,040.

[21] Appl. No.: 476,645

[22] Filed: Jun. 7, 1995

Related U.S. Application Data

[63] Continuation-in-part of Ser. No. 896,363, Jun. 10, 1992, Pat. No. 5,436,040.

[30] Foreign Application Priority Data

Jun. 17, 1991 [CA] Canada .................................. 2044779

[51] Int. Cl.[6] .............................. B32B 23/02; B31B 1/60

[52] U.S. Cl. ........................... 428/192; 428/120; 156/60; 156/65

[58] Field of Search ............................ 428/34, 119, 120, 428/167, 192; 52/786.1, 786.13, 172; 156/60, 65, 292

[56] References Cited

U.S. PATENT DOCUMENTS

| | | | |
|---|---|---|---|
| 4,113,905 | 9/1978 | Kessler | 428/34 |
| 4,622,249 | 11/1986 | Bowser | 428/34 |
| 5,436,040 | 7/1995 | Lafond | 428/34 |

*Primary Examiner*—Donald Loney
*Attorney, Agent, or Firm*—Paul Sharpe, McFadden, Fincham

[57] ABSTRACT

There is disclosed a sealant strip which can be used between substrate surfaces such as a pair of glass sheets or panes, the strip includes a shape retaining base member having an insulating body associated therewith. The body further incorporates an insulating material having a desiccant material impregnated therein.

11 Claims, 2 Drawing Sheets

Fig. 1
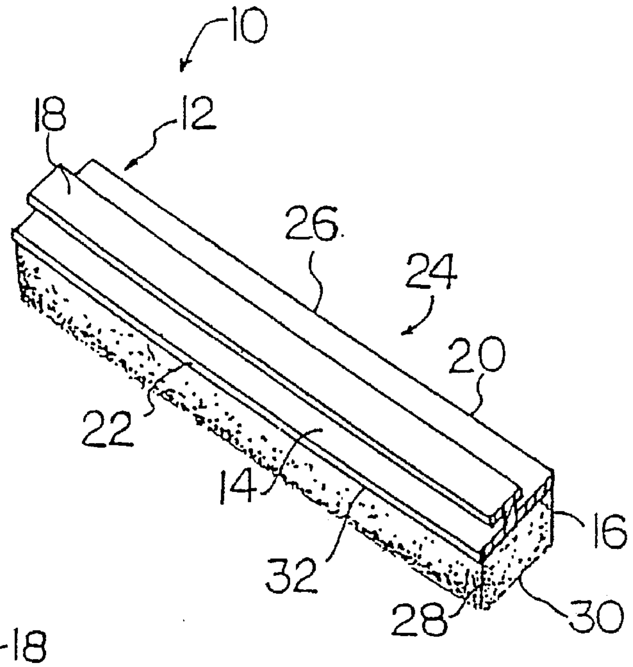
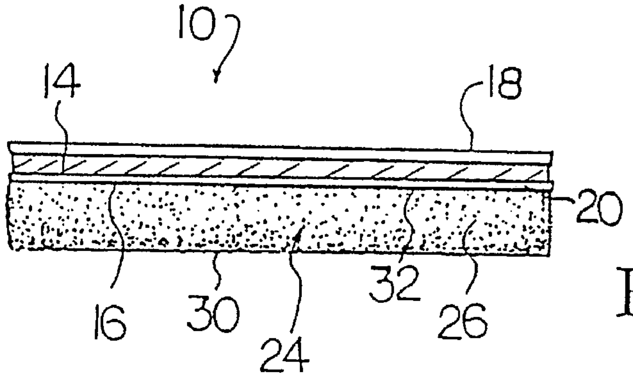
Fig. 2
Fig. 3
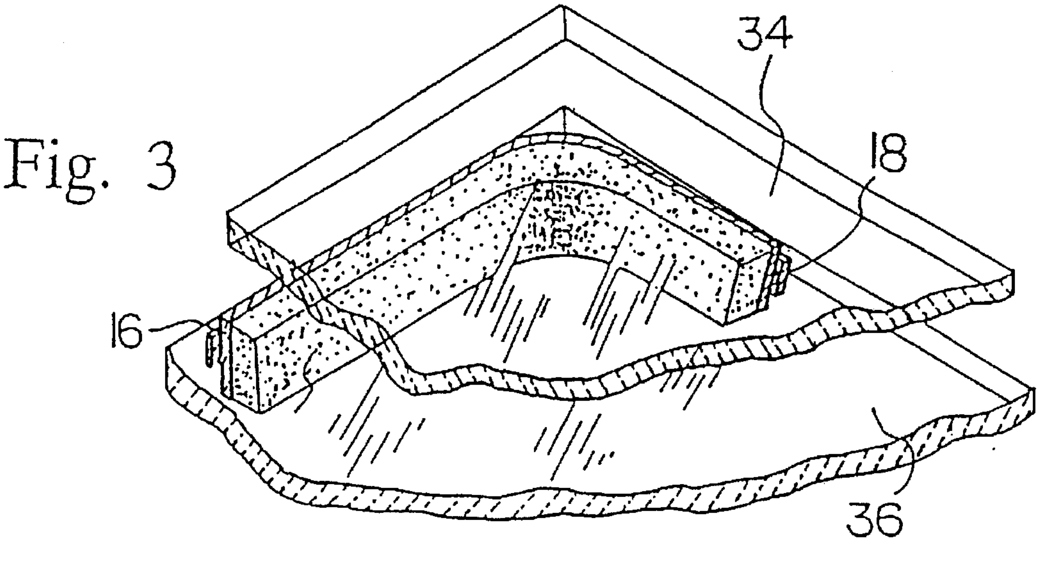

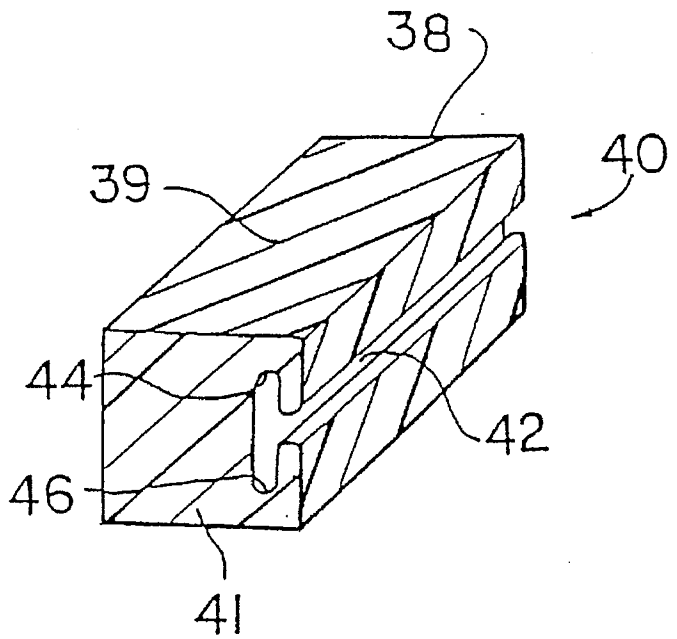
Fig. 4
Fig. 5
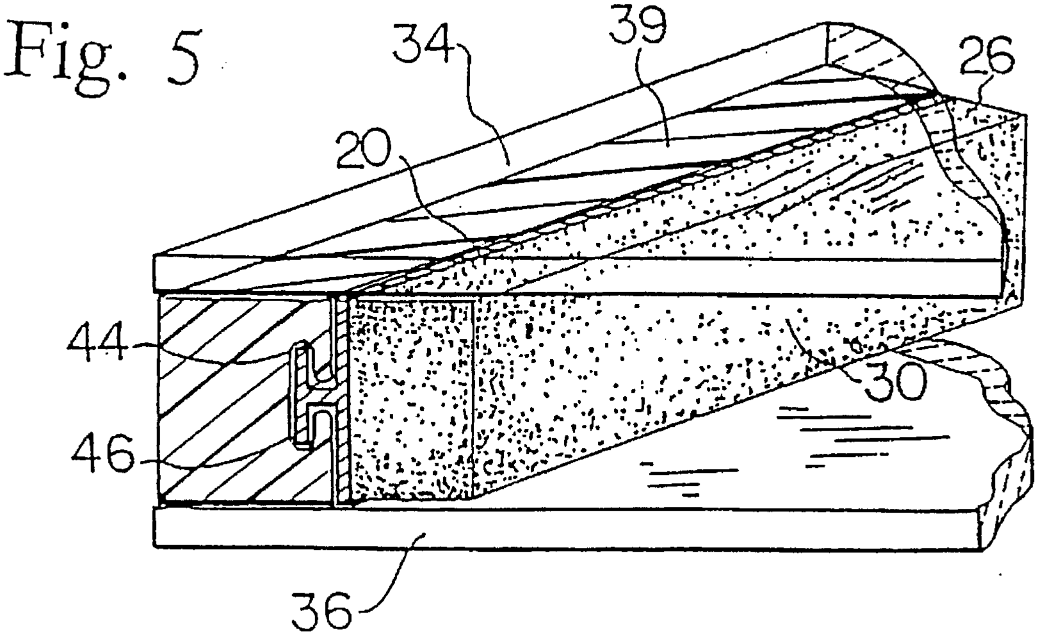

SEALANT STRIP INCORPORATING AN IMPREGNATED DESICCANT

This application is a continuation-in-part application of U.S. application Ser. No. 07/896,363 filed Jun. 10, 1992 and allowed on Jan. 9, 1995 as U.S. Pat. No. 5,936,040.

FIELD OF THE INVENTION

This invention relates to sealant strips.

More particularly, this invention relates to sealant strips which are useful, for example, as sealant strips between opposed pairs of substrate surfaces such as a pair of glass sheets or panes to form an insulated glass assembly. In another aspect of this invention, the invention relates to the method of forming a sealant strip and to a method of forming an insulated glass body using the sealant strip.

BACKGROUND OF THE INVENTION

Inasmuch as the present invention has particular application to the field of insulating glass, particular reference will be made thereto.

Insulating glass is normally formed of two or more sheets of glass joined together about their periphery by means of a sealant strip between these sheets. Conventional sealant strips are typically formed of a body of e.g. solid butyl rubber which may or may not include a metal reinforcement within the body. In other cases, sealant strips may also be formed of an extruded foam material of a synthetic nature and which typically must include a moisture and air impermeable thin backing of e.g. Mylar™ applied by adhesive to two or three sides of the strip.

In the teachings of the prior art, several steps are required to form an insulated glass assembly. Generally, prior art arrangements involve placing a removable spacer between opposed substrates, injecting a sealant therebetween, allowing the sealant to cure and finally removing the spacer means. In application where permanent spacers are used, an adhesive must be applied thereto to secure the same between the sheets, the spacer is then placed therebetween and a sealant injected into the periphery formed between the edges of the glass and the spacer. In addition, desiccants are often included in the sealant material, which has been found to have limitations in effective moisture absorbing between the sheets.

It is apparent that the prior art practices are labour intensive, messy and provide many opportunities for ineffective construction of insulated glass assemblies.

SUMMARY OF THE INVENTION

The present invention provides an effective sealant strip for use in fabricating insulated glass assemblies which traverses the limitations of the prior art practices by providing an energy saving and easily fabricated insulated glass assembly.

One object of this invention is to provide a sealant strip for application between a pair of opposed substrates comprising an elongated base member having a plurality of surfaces including at least one surface adapted to receive a retaining means, an insulating body associated with a surface of the base member other than at least one surface, the body having spaced apart substrate engaging surfaces adapted for placement in juxtaposition with a substrate surface, and retaining means associated with at least one surface of the base member for retaining back-fill whereby the back-fill anchors the strip between the opposed substrates.

Another object of this invention is to provide an insulated glass assembly comprising a pair of opposed glass surfaces, the surfaces having a sealant strip at least partially extending inwardly from the exterior thereof between the glass surfaces, the sealant strip and elongated base member having a plurality of surfaces including at least one surface adapted to receive a retaining means, the sealant strip further including an insulating body associated with the surface of the base member other than at least one surface, the body having spaced apart substrate engaging surfaces adapted for placement in juxtaposition with a substrate surface and retaining means associated with at least one surface of the base member for retaining back-fill whereby the back-fill anchors the strip between the surfaces.

A still further object of this invention is to provide a method of forming a sealant strip comprising providing a base member having an insulating body associated therewith, mounting the base member and the insulating body between a pair of opposed substrate surfaces, and anchoring the insulating body and the base member with a back-fill between the substrate surfaces to thereby seal the same.

The base member and insulated body may be coextruded or be fastened together by suitable means e.g. chemical or thermal bonding.

In an alternate form, the base member may include a plurality of projecting elements to retain the back-fill material.

Further, the cooperating elements of the base member and back-fill material may be reversed, i.e. the projecting element may be a channel which engages a projecting element of the back-fill material. Suitable back-fill material may comprise the known butyl polymers for this purpose or other suitable materials.

In greater detail in the present invention, the insulating body may be formed of any suitable solid or foamed cellular structure which may in turn, be of any suitable thermoplastic or thermal setting polymeric material. Typical of such materials are, as representative examples, polyurethanes, polyolefins such as polyethylene, polypropylene, copolymers thereof and the like; polysilicones, polyvinylchlorides, etc. These materials may be used in a solid or foamed form; in the case of solid materials, materials such as various butyl polymers, ethylene polymers, polyamides and the like may be employed. In the case where it is desired to have high insulating properties for the insulating body, polysilicones or polyurethanes are particularly desirable. Generally, these latter products will be employed in the form of a foam structure, the density of which may vary considerably.

The insulating body will also be chosen, depending on the particular use of the product of the present invention and the type of assembly to be formed, to have certain other characteristics such as gas impermeability, moisture impermeability and the like. To this end, the particular polymeric material may be selected by those skilled in the art to have such properties where desired.

Generally speaking, for the insulating glass industry, the insulating strip or body will have appropriate dimensions which in turn, will also vary depending on the size and type of glass lites; typically, this strip will be from e.g. ¼" by ¼" to 1" by 1" or more depending on its application.

In another form of the invention, at least one of the insulating body or the back-fill retaining member will have rigidity characteristics such that it is non-compressible or compressible only to a predetermined extent sufficient to retain the opposed substrates in a spaced apart relationship.

Thus, in the case of solid insulating bodies, the degree of compressibility, where the insulating body is chosen to be the component to maintain the opposed substrates in a spaced apart relationship, of a nature such that the body will only slightly compress or be substantially non-compressible as desired. In the case of foamed insulating bodies, the compressibility may be controlled by providing a solid, rigid foam which may normally be compressible to a limited extent or at least when compressed, still maintains sufficient spacing between the opposed substrate surfaces.

In accordance with the present invention, the insulating body is provided with a desiccating material. The material is impregnated within the insulating body for absorption of moisture from the space or chamber defined between a pair of juxtaposed substrates secured together by the sealant strip of the present invention.

In a particularly preferred form of the present invention, the insulating body may be a foamed body having the desiccant therein. Suitable desiccants include zeolites, potassium chloride, calcium chloride, silicon gels or any other hygroscopic material. The foam body will vary in density depending on application as will the amount and type of desiccating material used.

Typically, the desiccant material may comprise 1% to 50% or more of the insulating body depending on application.

The back-fill retaining member of the present invention comprises a body having a first member adapted to be operatively associated with or engage the insulating body, and a second body member spaced from the first body member adapted to provide an anchoring or engaging member for back-fill material inserted between the opposed substrates for finishing purposes. To this end, the anchoring or engaging member of the body has a configuration which may be of a suitable geometrical configuration such as a "T" or arrowhead shaped profile which provides surfaces with which the back-fill material can engage with when the back-fill material is added or placed in juxtaposition with the retaining member. It will be appreciated that other configurations may also be employed for this purpose, so long as they provide a surface with which the back-fill material can engage.

The base member is adapted to fixedly secure or otherwise engage the back-fill member to the insulating body; to this end, the first member preferably has a surface or profile coextensive with a mating and engaging surface of the insulating body. Generally speaking, the insulating body may have a substantially flat planar and correspondingly, the first member will be of a substantially flat planar configuration.

In one form, the base member comprises an elongated planar length of material having opposed top and bottom surfaces.

The base member may be fabricated from materials having shape retention while being generally non-compressible. Such materials suitable to this end include polyethylene, polypropylene, polystyrene, composite materials, etc.

The base member includes an axially projecting continuous element projecting upwardly from one surface thereof. It is preferred that the projecting element includes recesses to engage with the back-fill material.

The back-fill retaining means may either be a generally flexible or rigid member, bearing in mind that preferably at least one of the back-fill member or the insulating body will have sufficient rigidity to function as a spacer. Preferably, this characteristic is provided with the back-fill retaining member for manufacturing ease and to this end, the back-fill retaining member may be any suitable plastic (resinous) or metal material.

Suitably, any thermoplastic material such as the polyolefins, polyamides, polyvinylchlorides, or the like may be employed while in the case of metals, materials such as aluminum, steel alloys, etc. may be used. Such back-fill members may be extruded in an appropriate profile by simple extrusion operations.

As noted above, the back-fill member may also be of a metallic material; this is possible since with the assembly of the present invention, as used in insulating glass, the metallic material will not necessarily or desirably form or have any insulating function but rather, it may be used strictly for structural integrity purposes. In other cases, however, this invention also permits the use of totally flexible, very thin, back-fill retaining members which need not have any structural strength characteristics where the spacing function of the sealant strip is provided by the insulating body. Thus, even thin flexible strips of e.g. "Mylar" can be employed.

The present invention provides for several possible arrangements of the back-fill retaining member; in one case, these may project from the insulating body whereby the first member of the back-fill retaining member is within or forms part of the actual insulating body with only the second member projecting from the insulating body; in other embodiment, the back-fill member may be provided as a separate member which is secured by e.g. suitable adhesives to a surface of the insulating body whereby the back-fill retaining member is a separate entity placed in juxtaposition with the insulating body.

Having thus generally described the invention, reference will now be made to the accompanying drawings, illustrating preferred embodiments.

BRIEF DESCRIPTION OF THE DRAWINGS

FIG. 1 is a perspective view of one form of a sealant strip according to the present invention;

FIG. 2 is a side view of the embodiment of FIG. 1;

FIG. 3 is a perspective view of the strip as positioned between opposed substrate surfaces;

FIG. 4 is a perspective view of the back-fill material; and

FIG. 5 is an enlarged view of the strip and back-fill material as positioned between opposed substrate surfaces.

DETAILED DESCRIPTION OF THE PREFERRED EMBODIMENTS

Referring to FIGS. 1 and 2, shown is a perspective view and a side view of the sealant strip of the present invention generally indicated by numeral 10. The strip comprises an elongated generally rectangular planar length 12 of material which is preferably non-compressible or compressible only to a certain predetermined extent sufficient to retain opposed substrates, e.g. glass, plastic, etc. in a spaced apart relationship. Suitable materials to provide the necessary rigidity include, for example, polyolefins, polyamides, polyvinylchlorides or, in the case of metals, aluminum, steel, suitable alloys or composite materials.

The elongated length, having a top face 14 and bottom face 16, preferably includes a continuous element 18 projecting normally of the top surface 14. The projecting element is spaced inwardly from the opposed spaced apart sides 20 and 22 of the strip 10 and is unitary with the elongated strip 12. The projecting element 18, according to this embodiment, has a T-shaped in profile having recesses 18A and 18B. Although this is illustrated, the projecting element 18 may comprise numerous profiles which are sufficient to retain back-fill material typically used in insulating glass assemblies. Other useful engaging surface profiles may be, for example, arrowhead shapes, or any other profile which defines inwardly extending recesses 18A and 18B between the top face 14 of the strip 12 and the profile of the projecting element 18. The strip 12, in greater detail, may be as is conventional in the art, extruded to produce the same with the projecting element in an extrusion process. Further, it is preferred that an insulating body, generally referenced in the drawings by numeral 24, be associated with the bottom face 16 of the strip 12. The insulating body 24 may be bonded to the face 16 by suitable means e.g. chemical bonding by adhesives, oxidants etc. or by thermal bonding, e.g. ultrasonic methods.

Referring to the insulating body 24 in greater detail, the body preferably is elongated and projects normally of surface 16 of strip 12 and includes spaced apart sides 26, 28, bottom face 30 and spaced apart top face 32 which is bonded to bottom surface 16 as herein previously described. The sealant strip will vary in size depending on application and the size of glass panes employed, but typically the strip will be from 0.25" by 0.25" to about 1" by 1" or more.

The insulating body 24 is preferably formed of suitable solid or foamed cellular structures which may, in turn, be any suitable thermoplastic or thermo-setting polymeric materials. In a preferred embodiment, the material is foamed polyurethane and contains an impregnated desiccant therein. It will be understood that other suitable polymers may be used in a solid or foamed structure such as polyethylene, polypropylene, copolymers thereof, polysilicones, polyvinylchlorides etc. Suitable desiccants impregnated in the polyurethane foam include calcium chloride, silica gel, zeolites, potassium chloride or any other suitable hygroscopic material. The hygroscopic material may be added to the polyurethane material during a foaming step to ensure adequate impregnation as is the convention in the art. In addition, the rigid materials of the strip 12 are preferably malleable facilitating ease of use and, more importantly, shape retention. This will be discussed in greater detail hereinafter.

The insulating body, i.e. the foam body 24 may be coextruded with the strip 12 or affixed thereto in a separate step. The foam body 24 may be from about 0.125" to 2" or more wide and will vary according to the application. Generally, the width of the insulating body 24 will preferably be wide enough to provide supporting generally non-compressible surfaces in order to support panes of glass on both sides thereof.

Referring to FIG. 3, shown is a perspective view of the sealant strip 10 in position between two opposed sheets of glass 34. As illustrated, the strip 10 is one continuous elongated length, which is preferably discontinuous at only one point, namely, the point where the ends of the strip meet. In this arrangement, the insulating capability of the strip is not appreciably affected. It is preferred that the sealant strip 10 be spaced inwardly from the outside edges 36 of the glass substrates 34 to facilitate the placement of back-fill sealant material 38 therein. This is illustrated in FIG. 4. Suitable back-fill material includes thermoplastics e.g. butyl polymers, styrene-butadiene polymers, thermosetting materials e.g. acrylic polymers or thermoplastic-thermosetting compounds, such as those known in the art. This material may be extruded co-terminously or simultaneously with the elongated length of strip 12 and insulating body 24. Preferably back-fill material 38 comprises an elongated length of material having opposed top 39 and bottom 41, and a face 40 in which there is centrally located an axial channel 42 recessed inwardly of the face 40. It is particularly preferred that the channel 42 include spaced apart lateral recesses 44 and 46 which are adapted to receive and cooperate with the projecting element 18 and, more specifically, cooperate with recesses 18A and 18B. The top 39 and bottom 41 may include suitable adhesives known in the art to bond substrate surfaces thereto. Thus, in insulated glass assembly as illustrated in FIG. 5 by mounting the sealant strip 10 between a pair of opposed surfaces and anchoring the same with back-fill material adapted to cooperate with the strip 10.

In an alternate form, the material 38 may be injected using known techniques for contact with the top face 14 of the strip 12 thus filling in the recesses of the projecting element 18 which thus results in the sealant being retained by the element 18 when the sealant has set. This material, once set, seals the panes 34 and sealant strip 10 into a unitary insulated glass assembly.

As those skilled in the art will realize, these preferred illustrated details can be subjected to substantial variation, without affecting the function of the illustrated embodiments. Although embodiments of the invention have been described above, it is not limited thereto and it will be apparent to those skilled in the art that numerous modification form part of the present invention insofar as they do not depart from the spirit, nature and scope of the claimed and described invention.

I claim:

1. A sealant strip for application between a pair of opposed substrates comprising:

an elongated base member having a plurality of surfaces including at least one surface for receiving a retaining means;

an insulating body associated with a surface of said base member other than said at least one surface, said body having spaced apart substrate engaging surfaces adapted for placement in juxtaposition with a substrate surface; and sealant retaining means associated with said at least one surface of said base member for retaining sealant whereby said sealant anchors said strip between said opposed substrates.

2. The sealant strip of claim 1, wherein said insulating body includes an impregnated desiccant material therein.

3. The sealant strip of claim 1, wherein said insulating body comprises a shape retaining material.

4. The sealant strip of claim 1, wherein said sealant material comprises a polymeric material.

5. The sealant strip of claim 1, wherein said sealant retaining means projects from said at least one surface.

6. The sealant strip of claim 5, wherein said sealant retaining means projects normally of said at least one surface.

7. The sealant strip of claim 6, wherein said sealant retaining means is axially mounted on said base member.

8. The sealant strip of claim 7, wherein said sealant retaining means is continuous.

9. The sealant strip of claim 6, wherein said sealant retaining means includes recesses therein.

10. A method of forming a sealant strip comprising:

providing a base member having an insulating body associated therewith;

mounting said base member and said insulating body between a pair of opposed substrate surfaces; and fixing said insulating body and said base member with a sealant between said substrate surfaces to thereby seal the same.

11. The method of claim 10, wherein said sealant material comprises butyl material.

* * * * *